Nov. 20, 1973  M. S. IYENGAR ET AL  3,773,904
PROCESS FOR THE PRODUCTION OF CARBON BLACK FROM COAL
Filed Aug. 10, 1971
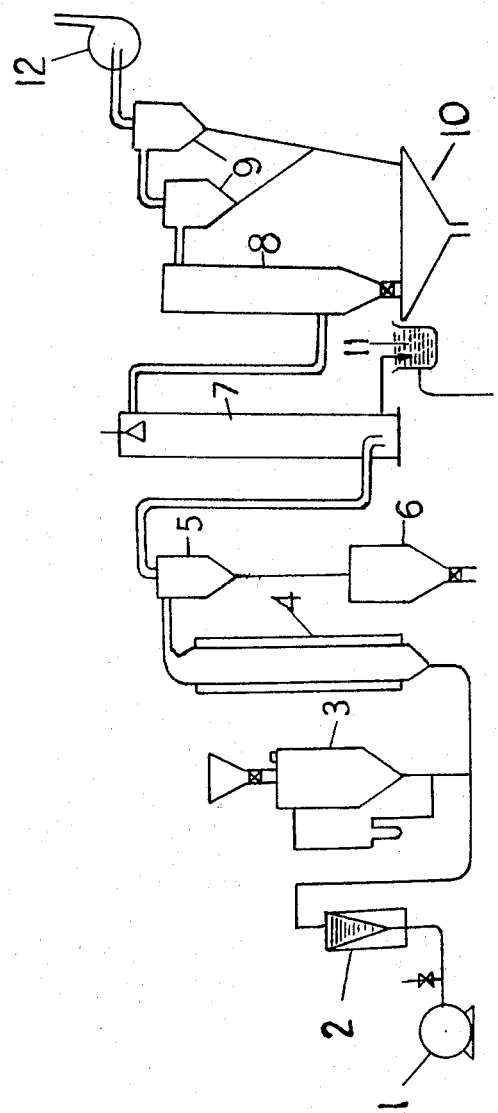
INVENTORS
MADHUR SRINIVAS IYENGAR
REZAUL HAQUE
SHRI RANJIT KUMAR CHAKRABARTI
SHRI MANINDRA LAL DUTTA
SHRI ABHAY KUMAR SINGH
BY Sughrue, Rothwell, Mion, Zinn & Macpeak
ATTORNEYS

United States Patent Office 3,773,904
Patented Nov. 20, 1973

3,773,904
PROCESS FOR THE PRODUCTION OF CARBON BLACK FROM COAL
Madhur Srinivas Iyengar, Rezaul Haque, Ranjit Kumar Chakrabarti, Manindra Lal Dutta, and Abhay Kumar Singh, Jorhat, Assam, India, assignors to Council of Scientific & Industrial Research, New Delhi, India
Filed Aug. 10, 1971, Ser. No. 170,541
Int. Cl. C09c 1/48
U.S. Cl. 423—449        8 Claims

ABSTRACT OF THE DISCLOSURE

A process for producing carbon black from crushed coal. The coal is carbonized in a fluidized bed in a refractory reactor at 1200° C. The char is removed in a cyclone separator and the remaining flue gases laden with carbon black are passed through a water scrubber, an electrostatic precipitator and a further cyclone to remove and collect the carbon black.

---

This invention relates to a process for the production of carbon black which is very widely used as a reinforcing agent in rubber industry and as pigment in black plastic, paints, lacquers and enamels. Colour grade blacks are also used for making printing inks, paints, and even for typewriter ribbons and carbon paper.

The process for the preparation of carbon black by the partial combustion or thermal decomposition of gaseous or liquid hydrocarbons, such as natural gas, oil refinery residues and tar oils is already known. Such known processes have the drawbacks, namely, that they are costly and that they may be used only in limited areas where the particular gaseous or liquid hydrocarbons are available.

It has also been proposed to prepare carbon black from coal, by beneficiating finely crushed coal and thereafter carbonizing it in a fluidized bed and recovering the carbon black from the char by screening through 200 BS screen. In such a process the carbonization of the coal is effected at 700° C., and no attempt has been made to recover carbon black from the flue gases. Such known process, although utilizing a raw material comparatively cheaper than gaseous or liquid hydrocarbons, has the drawback that it involves the additional cost for the beneficiation of the coal and for the final recovery of the carbon black by screening.

This invention has for its object an improved process which will be free from the drawbacks aforesaid.

This invention consists of a process for the preparation of carbon black from coal, wherein the coal is crushed and thereafter carbonized in a fluidized bed in a refractory reactor at a temperature of about 1200° C., and the carbon black is recovered from the flue gases.

In a preferred method of carrying out this invention into practice, the improved method according to this invention may be modified as follows:

(1) The raw coal used should be low in its ash content (5% maximum) and rich in its vitrain (80% or more of coal floating over a liquid of specific gravity 1.30) and volatile content (above 35%, preferably in the range of 35–40%).

(2) A partial recovery of the carbon black from the flue gases may be effected by water scrubbing.

(3) Recovery of the remainder of the carbon black from the residual gases subjected to water scrubbing may be effected by passing the said residual gases through an electrostatic precipitator, or a bag filter. In case a bag filter is used, glass cloth should be used as the filtering medium and the initial stage of water scrubbing has to be restricted to get a bag filter temperature of about 315° C. (i.e. temperature above the dew point of the gas).

A flow diagram of carrying out the improved process according to this invention is given in the accompanying drawings.

In carrying out the improved process, finely crushed coal from a coal feed bin 3 is conveyed by means of a measured quantity of air from a blower 1 into the reactor 4, the quantity of air introduced being measured by a rotameter 2.

In the reactor 4, carbonization and formation of carbon black takes place at about 1200° C.

The product from the reactor passes through a cyclone 5 where the char is separated and is collected in a char receiver 6.

Flue gases laden with carbon black pass through the water scrubber 7 where partial separation of the carbon black takes place, and the flue gases containing the remaining carbon black are passed through an electrostatic precipitator (or through a bag filter 8 and cyclones 9, where the remaining carbon black is separated and collected.

The carbon black from the water scrubber 7 is freed of water in a water separator 11 and the water-freed carbon black is stored in a storage vessel 10.

The product is dried and pelletized by conventional processes.

From the cyclone 9 the flue gases pass into the atmosphere through exhaust 12.

The following is a typical example of this invention:

Hand-picked coal from the Baragolai colliery, Assam, containing about 2.5 percent ash was crushed to ½ inch size and ground through 72 BS (40 percent of the coal passing through 200 BS) and then carbonized in the fluidized bed using air as the fluidizing medium. About 50 percent of the coal burns to provide the heat of reaction, 30 percent is converted to char and remaining 20 percent of the coal is converted to carbon black.

The char is separated in a cyclone separator.

The flue gases laden with carbon black are then scrubbed with water, whereby 40 percent of the carbon black is recovered. The remaining 60 percent of the carbon black is recovered by allowing the flue gases from water scrubber to pass through an electrostatic precipitator or through bag filters.

The yield of carbon black is 20 percent of the coal.

It will be seen that this invention has, inter alia, the following advantage as compared with conventional processes:

(1) It eliminates the step of beneficiating the raw coal.

(2) It eliminates the step of screening the char to recover the carbon black.

(3) It eliminates the steps of any further treatment of the final product, such as acid treatment to reduce the inorganic impurities from the carbon black, which steps are indispensable in the conventional process for production of carbon black from coal.

(4) It does not rigorously insist upon any particular degree of fineness to which the coal should be reduced, before it is carbonized in the fluidized bed.

(5) Unlike expensive raw material such as gaseous or liquid hydrocarbons, it uses a product which is cheaper and abundantly available.

(6) The product obtained by the improved method is of an improved quality, as compared with the quality obtained by the above-mentioned conventional processes.

(7) The installation of the necessary plant for carrying out the improved method is relatively less expensive.

What is claimed is:

1. A process for producing carbon black from coal consisting essentially of:
   (1) crushing the coal;
   (2) carbonizing the coal in a fluidized bed employing air as the fluidizing medium in a refractory reactor at a temperature of about 1200° C. to produce flue gases containing carbon black and char;
   (3) separating the char from said flue gases in a cyclone separator; and
   (4) recovering the carbon black from the resulting flue gases.

2. A process as claimed in claim 1, wherein the raw coal used is of low ash content and of rich vitrain and volatile content.

3. A process as claimed in claim 1, wherein the coal is crushed through 72 BS, 40 percent of the coal passing through 200 BS.

4. A process as claimed in claim 1, wherein a partial recovery of the carbon black from the flue gases is effected by water scrubbing.

5. A process as claimed in claim 4, wherein the recovery of the carbon black from the residual gases after water scrubbing, is effected by passing them through an electrostatic precipitator.

6. A process as claimed in claim 4, wherein the recovery of the carbon black from the residual gases after water scrubbing, is effected by bag filtration.

7. A process for producing carbon black of improved quality from coal consisting essentially of:
   (1) crushing coal having a maximum ash content of 5%, a rich vitrain content such that at least 80% of the coal floats over a liquid having a specific gravity of 1.30, and having a volatile content of above 35%;
   (2) carbonizing the coal in a fluidized bed employing air as the fluidizing medium in a refractory reactor at a temperature of about 1200° C. to produce flue gases containing carbon black and char;
   (3) separating the char from said flue gases in a cyclone separator;
   (4) partially recovering the carbon black from the resulting flue gases by water scrubbing whereby about 40% of the carbon black is recovered; and
   (5) recovering the remaining carbon black from the flue gases.

8. The process of claim 7 wherein the ash content of the coal which is crushed in step (1) is about 2.5% by weight.

References Cited

UNITED STATES PATENTS

| | | | |
|---|---|---|---|
| 2,614,069 | 10/1952 | Matheson | 201—31 X |
| 2,709,152 | 5/1955 | Totzek | 201—31 |
| 3,254,976 | 6/1966 | Wolf et al. | 201—31 X |
| 2,868,695 | 1/1959 | Shea | 23—209.4 X |
| 3,424,556 | 1/1969 | Johnson | 23—209.4 |
| 3,404,960 | 10/1968 | Mansfield | 23—209.6 |
| 1,902,746 | 3/1933 | Yunker | 23—209.4 |

EDWARD J. MEROS, Primary Examiner

U.S. Cl. X.R.

201—31